United States Patent [19]

Winter, III et al.

[11] 3,927,987
[45] Dec. 23, 1975

[54] DEHYDROGENATION REACTOR

[75] Inventors: George R. Winter, III, Des Plaines; William G. Boney, Rolling Meadows, both of Ill.

[73] Assignee: Universal Oil Products Company, Des Plaines, Ill.

[22] Filed: Sept. 9, 1974

[21] Appl. No.: 504,397

Related U.S. Application Data

[60] Division of Ser. No. 451,660, March 14, 1974, which is a continuation-in-part of Ser. No. 301,007, Oct. 26, 1972, abandoned.

[52] U.S. Cl. ............ 23/288 K; 23/288 R; 23/288 E
[51] Int. Cl.² ..................... B01J 8/02; C10G 35/04
[58] Field of Search .......... 23/288 L, 288 K, 288 R, 23/288 E; 208/100, 146, 147

[56] References Cited
UNITED STATES PATENTS

| | | | |
|---|---|---|---|
| 1,927,286 | 9/1933 | Jaeger et al. | 23/288 R |
| 2,016,810 | 10/1935 | De Jahn | 23/288 R |
| 2,472,254 | 6/1949 | Johnson | 23/288 L X |
| 2,817,580 | 12/1957 | Marsh et al. | 23/288 R X |
| 3,620,685 | 11/1971 | Rogers et al. | 23/288 R |
| 3,784,361 | 1/1974 | Kubec et al. | 23/288 K X |

*Primary Examiner*—Barry S. Richman
*Assistant Examiner*—Bradley R. Garris
*Attorney, Agent, or Firm*—James R. Hoatson, Jr.; Robert W. Erickson; William H. Page, II

[57] ABSTRACT

An apparatus for the catalytic conversion of hydrocarbons which is especially suited for the dehydrogenation of long chain normal paraffins. The reactants pass through a radial flow catalyst bed and immediately impinge upon a cylindrical indirect heat exchange means in which the feed stream to the process is circulated as a cooling media, and the reactants then pass into a contact condenser located within the heat exchange means. A cooled stream of liquid reactor effluent is charged to the contact condenser to effect a condensation and separation of the reactants from the recycle gas within the reactor.

4 Claims, 1 Drawing Figure

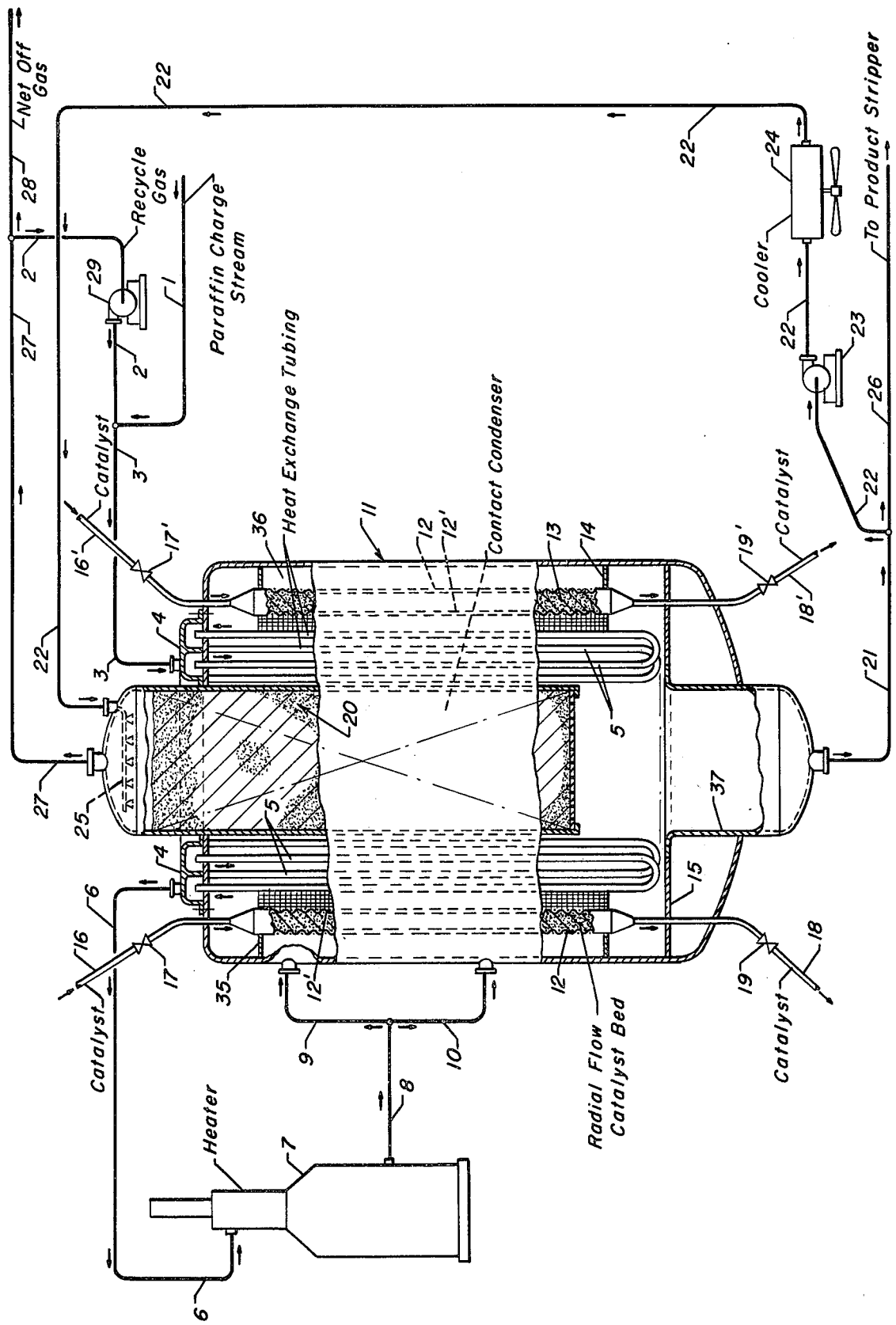

DEHYDROGENATION REACTOR

CROSS-REFERENCE TO RELATED APPLICATIONS

This application is a division of our prior copending application Ser. No. 451,660 filed Mar. 14, 1974 and entitled "Dehydrogenation Process and Reactor", which copending application is a continuation-in-part of our application entitled "Radial Flow Reactor With Indirect Heat Exchange", Ser. No. 301,007, filed Oct. 26, 1972 and now abandoned. All the teachings of both related applications are herein incorporated by this specific reference thereto.

BACKGROUND OF THE INVENTION

1. Field of the Invention

The invention pertains to a radial flow reactor apparatus for the conversion of hydrocarbons, which apparatus contains an indirect heat exchange means and a contact condenser. The invention provides means to effect the heat exchange, the condensation and the phase separation of the catalyst bed effluent stream within the outer vessel of the reactor.

2. Description of the Prior Art

Using an indirect heat exchange means within a reactor is shown by U.S. Pat. Nos. 2,433,670 and 3,753,662 (Cl. 23-289). The latter utilizes this means to cool a reacting gas to promote further reaction in a subsequent catalyst bed in a process governed by thermodynamic equilibrium.

As larger volumetric throughputs of reactants are being designed for, the diameter of the reactors used in high space velocity dehydrogenation processes has been steadily increasing. The resulting problems caused by the long residence time of the chemically unstable olefins within the centerpipe volume has been a subject of concern in the art. These olefins tend to polymerize and decompose resulting in lower yields from the process. U.S. Pat. No. 3,620,685 discloses the use of an inverted thumb-like structure to fill this centerpipe volume and to thereby quicken the flow of the heated reactants from the reactor and into an external heat exchanger.

The use of a contact condenser in which a portion of the condensed material is cooled and then returned to cause the condensation of a hydrocarbon containing stream being fed to the condenser is shown in U.S. Pat. No. 2,989,853 (Cl. 62-11).

A method for quickly changing the catalyst within an isomerization reactor is presented in U.S. Pat. No. 3,299,155. The total spent catalyst loading is removed from the bottom of the reactor and fresh catalyst is added at the top of the reactor.

BRIEF SUMMARY OF THE INVENTION

Our invention provides a reactor for the catalytic conversion of hydrocarbons, which comprises a vertically orientated, cylindrical enclosed outer vessel; two vertically orientated, concentric, cylindrical catalyst retaining screens located within the outer vessel; an indirect heat exchange means located within and adjacent to the innermost catalyst retaining screen; and a contact condensing means located within the indirect heat exchange means. This apparatus provides means for the catalytic conversion of a vaporized hydrocarbon feed stream in a radial flow reactor containing a cylindrical bed of solid catalyst; for contacting the effluent of the catalyst bed with a cylindrical heat exchange means located within the reactor to effect a cooling of the effluent; and for effecting a partial condensation and a separation of the effluent into a vapor stream and a liquid stream which are separately withdrawn from the reactor.

DESCRIPTION OF THE DRAWING

The drawing depicts the preferred embodiment of our invention, which is its utilization for the dehydrogenation of long chain normal paraffins. It is not so limited however, and various modifications to conform to varying processing conditions and alternative hydrocarbon conversion processes are still within the scope of the appended claims.

A liquid feed stream of normal paraffins enters the process through line 1 and is mixed with a recycle gas stream in line 2 to form a combined feed stream flowing through line 3. The combined feed stream enters a circular distribution duct 4 located on the outer vessel 11 of the reactor. The inlet side of duct 4 distributes the combined feed stream to the inlet sides of the large number of hairpin heat exchange means 5 which form a cylinder within the reactor. The combined feed stream therefore flows down the inner side of the heat exchange means and up the outer side to maximize heat transfer and then returns to the collection side of duct 4. The now warmer combined feed stream leaves duct 4 via line 6 and passes into a fired heater 7. A now completely vaporized combined feed stream leaves heater 7 through line 8 and splits into different portions which enter the outer vessel 11 through lines 9 and 10.

The combined feed stream disperses into an annular distribution volume 36 on the inside of the cylindrical wall of outer vessel 11 and then passes inward through the outermost catalyst retaining screen 12. The heated combined feed stream then contacts an annular bed of dehydrogenation catalyst 13 located between catalyst screens 12 and 12'. A disc-shaped flow directing plate 14 seals off the bottom of the annular distribution volume to prevent reactants from by-passing catalyst bed 13. In a similar manner, a disc-shaped flow directing plate 35 seals off the top of the reactant distribution volume. The feed stream undergoes at least a partial conversion in the catalyst bed and exits through the innermost catalyst retaining screen 12' as an effluent stream which soon contacts the heat exchange means 5. This catalyst bed effluent stream is prevented from by-passing the heat exchange means by a second flow directing plate 15 located at the bottom of the heat exchange means.

The catalyst bed effluent then enters a contact condenser 20 wherein the long chain hydrocarbons in the catalyst effluent are cooled and condensed to form a liquid phase which accumulates in the bottom of outer vessel 11 and is removed through line 21. A volume of the liquid phase will be retained within the cylindrical wall 37 to activate a flow control means in line 21. The remaining uncondensed gases are further cooled as they pass upward through the contact condenser to the top of outer vessel 11 where they are removed in line 27. A part of these gases approximately equal to the net hydrogen production in the process is removed via line 28 and the remaining portion is utilized as the recycle gas stream in line 2. This recycle gas stream is pressurized in compressor 29 and returned to the process. The liquid phase withdrawn in line 21 is divided into a first portion passed to a product stripper through line 26 and a second portion which enters line 22 and is pressurized in pump 23. This second portion is then passed through a cooler 24 and returned to the outer vessel through line 22. In the cooler, this second portion is cooled sufficiently to provide the needed condensation of the catalyst bed effluent. It is then distributed over the contact condenser 20 by a liquid distributor 25. This cooled liquid flows downward countercurrent to the rising gases to provide efficient condensation of essentially all the heavy hydrocarbon material in the reactor effluent.

When it is necessary to replace the catalyst held between annular catalyst retaining screens 12 and 12', a number of valve means represented by valves 19 and 19' are opened and the catalyst is allowed to drain into a receiving vessel through a plurality of catalyst withdrawal conduits represented by 18 and 18'. Valves 19 and 19' are then closed and valves 17 and 17' are opened to allow fresh catalyst to enter the outer vessel 11 through a plurality of catalyst transfer conduits represented by lines 16 and 16'. The catalyst transfer conduits are equally spaced around the periphery of the outer vessel to allow complete and uniform removal and replacement of the catalyst.

DETAILED DESCRIPTION

Radial flow reactors are used in many petroleum and petrochemical conversion processes, including such processes as reforming, the isomerization of normal paraffins, the isomerization of alkyl aromatics, the hydrodealkylation of aromatic hydrocarbons, the conversion of benzene to cyclohexane and the dehydrogenation of long chain normal paraffins to the corresponding mono-olefin. Many of these processes are favored by the use of a low-pressure within the reaction zone, and currently such processes operate at a rather limited degree of conversion per pass over the catalyst. The combination of these factors results in a very large reactant flow rate at pressures of from about 15 to 200 psig.

The relative percentage of the total operating cost of these processes which may be attributed to the recirculation of the reactants and other gases increases as the pressure of the process is lowered. As an example, in some large low pressure plants, a dirrerence of 1 psi. over a reactant recirculation loop will increase net pumping cost by $25,000 per year. It is therefore very important that all pressure drops be minimized, and it is therefore an objective of our invention to provide a reactor and a process whereby low pressure, high space velocity, catalytic hydrocarbon conversion processes may be performed with a low pressure drop through the process and the reactor.

In petrochemical processing, and particularly in the dehydrogenation of normal paraffins, there are a number of undesirable side reactions which occur when the reactants are held within the reactor at the elevated reaction temperature and not in contact with the catalyst, a condition referred to as "thermal time." An example is the decomposition of olefins to diolefins and the formation of aromatic compounds. The ultimate effect is a decrease in the selectivity of the process and a lower return on invested capital. When the desired contact time of the reactants with the catalyst is very short, it is necessary to limit the catalyst to relatively thin layers. As larger volumetric throughputs of reactants are being designed for, the inner diameter of the reactor is increased so that maximum quantities of feed stock can be treated per unit time in a single reactor. Large centerpipe volumes are created in this manner. The centerpipe volume of a reactor is defined to be the volume within a radial flow reactor which is located inside of the innermost catalyst retaining screen. The lengthy thermal times within these large centerpipe volumes increases the undesirable side reactions, such as the polymerization of chemically unstable olefins, and therefore degrades the catalyst bed effluent. Rates of many chemical phenomena including the undesired side reactions are exponentially dependent on the absolute temperature of the reactants. Therefore, it is desirable to have the thermal time be as short as possible. It is therefore also an objective of our invention to reduce the thermal time within a radial flow reactor.

A remedy which has been proposed to reduce the thermal time is the use of an inverted thumb-like structure to fill the centerpipe volume and to thereby shorten the time required for the heated reactants to go from the reactor to an external heat exchanger. This however increases the pressure drop in the reactor. The present invention is an improvement over the prior art in that it reduces the net pressure drop in the process and also provides a means for quickly quenching the catalyst bed effluent. The effluent stream is also condensed and separated into gas and liquid effluent streams within the reaction vessel. Therefore, the present invention is also an improvement over the prior art in that it reduces the net capital costs of constructing such a process. The outer vessels and the connecting piping for the effluent-feed heat exchanger, the other heat exchangers used for cooling the reaction zone effluent and the vessel normally used to separate the catalyst bed effluent into separate gas and liquid streams are no longer required.

The sequential steps of heat exchanging a feed stream with the reactor effluent stream, further heating the feed stream and passing it through the reactor, and then cooling and separating the reactor effluent are found in a sizable fraction of all catalytic petrochemical and petroleum refining processes. Regardless of the desired reaction, the needed capital expenditures and the continuously required utilities cost of operating the process are important to its profitable operation. One objective of our invention is to provide a reactor for the performance of any of these processes which results in the reduction of the cost of construction and the cost of operation of these processes. In accordance with this objective, our invention provides a reactor wherein the effluent stream of a cylindrical catalyst bed is contacted with an indirect heat exchange means located within the radial flow reactor and arranged in a cylindrical pattern adjacent to the innermost catalyst retaining screen, and the catalyst bed effluent stream is then passed into a contact condensing means located within the radial flow reactor to effect a partial condensation and a separation of the catalyst bed effluent stream into a vapor phase stream and a liquid phase stream which are separately withdrawn.

The apparatus is normally contained within a vertically orientated, cylindrical, sealed outer vessel having a closed top and bottom and numerous openings for the passage of various process streams. To aid in the description of its construction, the outer vessel may be divided into an upper portion and a lower portion, which comprise respectively the top and bottom half of the vessel. As used herein, terms such as innermost or inward are meant to be in reference to the central axis of the reactor and respectively refer to a placement or direction closer or toward the axis. The dominate internal structures contained within the outer vessel include the two or more vertically orientated, concentric, cylindrical catalyst retaining screens. These screens form an annular reactant distribution volume between the inner wall of the outer vessel and the outer surface of the outermost catalyst retaining screen, and they also form an annular catalyst retention volume between the catalyst retaining screens. Three catalyst retaining screens may be used to form two catalyst retention volumes when it is desirable to load the reactor with two types of catalyst or with a bed of adsorbent material before or after a bed of catalyst. It may also be desirable to have four catalyst retaining screens within the reactor to provide a void space between two catalyst retention volumes. This situation could arise when it is necessary to either heat or cool the reactants between sequential passes through catalyst beds or when it is desired to add additional portions of one or more reactants or to add a different reactant to the effluent of a first catalyst bed. In these situations, it is contemplated that there will be other structures such as heating coils or heat exchange means or reactant distribution means located in a void annular volume between the second and third screens inward. In a typical commercial paraffin dehydrogenation reactor, the catalyst bed may be approximately 10 to 60 centimeters thick and the centerpipe volume may be approximately 1.8 to 4.6 meters across and 6 or more meters high. The construction of these catalyst retaining screens is not critical to the concept of the invention, and they may comprise solid perforated plates, a fine screen material covering large perforations in a solid plate, or any form of slits or openings between horizontal or vertical windings of flat metal or wire-like conduit. It is preferred that the catalyst retaining screen comprise a multitude of parallel, vertical, wedge shaped bars having their widest portion facing the catalyst. The catalyst retention screens may or may not have a solid portion at their top and bottom to prevent the flow of reactants around the porous portion of the screen. If present, the solid portion may be filled with either inert material such as alumina balls or with additional catalyst to allow for the settling of the catalyst contained within the catalyst bed.

After passing through the catalytic material, the reactants emerge from the innermost catalyst retention screen as a catalyst bed effluent stream and impinge upon an indirect heat exchange means. The overall shape of the indirect heat exchange means must resemble a vertically orientated hollow cylinder. This provides a cylindrical central void volume in which to place the contact condensing means. However, its exact shape, size or construction is not a limiting factor, and it may comprise anything from the circular array of U-tubes shown in the drawing to a plate-type exchanger or a spiral or circular grid of heat exchange tubes. The heat exchange tubes themselves may of course have fins either mechanically attached onto their surface or rolled into their surface or may have a porous surface. It is also within the scope of this invention that baffles may be installed across the tubes to create turbulence or to direct the flow of the reactants in a manner advantageous to the cooling of the catalyst bed effluent. Shown in the drawing is the preferred arrangement of the indirect heat exchange means, which consists of a large number of short bend U-tube heat exchangers, commonly referred to as hairpin-type heat exchangers, arranged in a cylindrical array around the outer edge of the centerpipe volume and adjacent to the catalyst retaining screen over substantially all the inner surface of the catalyst retaining screen through which the reactants pass. The surface area and the amount of cooling required is dependent upon the specific reactor usage and cannot be specified briefly in a detailed manner for all possible situations. The optimum configuration of this heat exchange means will also be dependent on the flow rate of the material within the tubes and whether this is liquid or gas phase material. Alignment of the tubes along radial lines originating at the vertical axis of the reactor increases the efficiency of this heat exchange with the catalyst bed effluent by approximating countercurrent flow.

Some form of distribution system is needed to pass equal quantities of coolant material through each of the elements comprising the heat exchange means and to collect the effluent of heat exchange means. One possible form, which consists of two concentric channels, is shown in the drawing. Alternatively, these channels may be located on the bottom of the reactor, or one channel may be located on the top of the reactor and a second channel may be located on the bottom of the reactor. The cooling medium passing through the heat exchange means may be any available fluid, but it is advantageous to utilize some stream requiring a net input of heat, such as a recycle gas stream, one of the reactants being fed to the reactor, a fractionation column charge stream, or as in the preferred embodiment, the total combined reactor charge stream. In this manner, the conventional economizing by heat exchange of the reactor effluent with the reactor charge stream is conducted within the reactor. This heat exchange means could also be utilized to produce high pressure steam for use in this or other processes. The heat exchange means may be mounted on a separate closing plate bolted to the top of the reactor to allow relatively simple removal for maintenance or inspection.

A third specific element of our invention is a contact condensing means located within the centerpipe volume of the radial flow reactor. The contact condensing means is preferably a cylindrical bed of a regular-shaped vapor-liquid contacting media such as Berl saddles or Rashing rings. The contact condensing means will normally be concentrically located within the middle of the centerpipe volume but it is preferably located at a higher relative elevation than the catalyst bed. The preferred placement is therefore as shown in the drawing with the contact condensing means extending a sufficient distance above the top of the annular catalyst bed. This allows the cooling of all material which exits from the top catalyst bed by the countercurrent contacting of the catalyst bed effluent with the cooling liquid introduced above the condensing means. This insures complete condensation of the heavy hydrocarbons in the catalyst bed effluent stream.

It is not necessary for the contact condensing means to extend downward to the bottom of the catalyst bed since vapor phase material cannot exit from the liquid containing bottom portion of the reactor and therefore is forced to pass upward into the condensing means. This placement should also prove beneficial in terms of a slightly reduced pressure drop through the contact condensing means. The vapor-liquid contacting media forming the packed bed of the contact condensing means will normally be confined by a solid vertical wall as shown in the drawing or a perforated vertical wall.

This wall is either hung from the top of the reactor or supported by braces attached to the bottom of the reactor. It is also possible for the contact condensing means to consist of other types of vapor-liquid contacting materials such as perforated plates or a large number of horizontal, liquid covered slats. The term "contact condensing means" as used in the appended claims is intended to include any means by which the catalyst bed effluent stream is contacted with a relatively cool stream of liquid which causes the condensation of the heavier hydrocarbons within the catalyst bed effluent stream and the separation of the catalyst bed effluent stream into a vapor phase and a liquid phase, irrespective of whether the liquid which causes the cooling of the catalyst bed effluent stream is formed by condensation and recirculation of a portion of the catalyst bed effluent stream or the cooling liquid is an external material which is injected into the reactor. The contact condensing means may also include separate cooling coils which cause condensation of a portion of the catalyst bed effluent stream and the in situ formation of a cool liquid.

There are several other elements to our invention. First of all, there is a reactant inlet means which communicates with the annular reactant distribution volume between the inner wall of the enclosed outer vessel and the outermost catalyst retaining screen. Several of these reactant inlet means may be located along or around the side of the vessel to aid in a more uniform distribution of the reactants through various parts of the catalyst bed. It is also possible to use some sort of baffle-type device within the reactant distribution volume to prevent the direct impingement of the incoming reactant stream upon the outermost catalyst retaining screen. Second, there is required a vapor outlet means communicating with the internal volume of the outer vessel at a point above the contact condensing means to effect the removal of the uncondensed portion of the catalyst bed effluent stream. A demisting pad or screen may be placed across the opening of the vapor outlet means to remove entrained liquid from this effluent vapor stream. Third, there is required a liquid outlet means communicating with the internal volume of the outer vessel at a point below the contact condensing means, and as indicated in the drawing, preferably at a point substantially below the bottom of the catalyst bed to allow the accumulation of a layer of liquid material within the reactor. The flow of liquid through the liquid outlet means will then be controlled by liquid level sensors contained within the reactor.

Optional elements of our invention include an inlet means and a distribution means for the cooling liquid which is normally fed to the top of the contact condensing means. The cooling liquid inlet means is a conduit passing through the wall of the outer vessel and leading to the distribution means. Suitable cooling liquid distribution means include a grid-like arrangement of conduits with a multitude of perforations, or a number of spray nozzles chosen to provide a relatively uniform spreading of the incoming cooling liquid over the packed bed or plates which comprise the contact condensing means. Many other structural elements are also provided, such as the disc-shaped flow directing plates shown in the drawing. These are necessary to prevent the reactant stream from by-passing the catalyst and also to prevent the catalyst bed effluent stream from by-passing the indirect heat exchange means. Other structural elements would be required to support the different main elements such as the indirect heat exchange means, the contact condensing means and the catalyst retaining screens.

Finally, there are the optional catalyst transfer conduits which pass through the walls of the outer vessel and communicate with the one or more of the catalyst retention volumes. It is preferred that there be a large multitude of these catalyst transfer conduits with a first plurality of the catalyst transfer conduits passing through the upper portion of the outer vessel and with a second plurality of catalyst transfer conduits passing through the lower portion of the outer vessel to allow the rapid and uniform removal and replacement of the catalyst. The catalyst transfer conduits will normally be arranged in a circular pattern on the top and bottom of the reactor and consist of substantially vertical conduits with one or more valve means to prevent the flow of catalyst and reactants. To allow the changing of catalyst while the catalyst and the reactor are at operating conditions, it is possible that the catalyst transfer conduits will connect with pressurized lock hoppers located above and below the reactor. The catalyst may be purged and conditioned in the lock hopper above the reactor, and may be purged and cooled in the lock hopper below the reactor. By having the lock hoppers at the same pressure as the reactor before communicating them with the reactor, it is possible to drain and refill the catalyst retention volume with only minimal flow of the reactants from the reactor.

In accordance with the description given above, our invention may be described as a reactor for the catalytic conversion of hydrocarbons which comprises: (a) an outer vessel having a vertically orientated, cylindrical internal volume; (b) a first vertically orientated catalyst retaining screen, located within the outer vessel a distance inward from the inner surface of the outer vessel and defining an annular reactant distribution volume between the first catalyst retaining screen and the outer vessel; (c) a second vertically orientated catalyst retaining screen located within the first catalyst retaining screen a distance inward from the first catalyst retaining screen and defining an annular catalyst retention volume between the first and the second catalyst retaining screens; (d) an indirect heat exchange means arranged as a vertically orientated hollow cylinder having a cylindrical central void volume and located adjacent to the second catalyst retaining screen, at a distance inward from the second catalyst retaining screen; (e) a contact condensing means located within the central void volume of the indirect heat exchange means; (f) a reactant inlet means communicating with the reactant distribution volume; (g) a vapor outlet means communicating with the internal volume of the outer vessel at a point located above the contact condensing means; and, (h) a liquid outlet means communicating with the internal volume of the outer vessel at a point located below the contact condensing means.

As previously mentioned, our invention can be applied to a wide variety of processes which include the basic steps passing a vaporized reactant stream through a catalyst bed within a radial flow reactor, heat exchanging the effluent of the catalyst bed, partially condensing this heat exchanged catalyst bed effluent and then separating the effluent into a liquid and vapor phase. For instance, our invention may be applied to the isomerization of normal paraffins having from 4 to 8 carbon atoms per molecule when this process is conducted in a radial flow reactor. A typical isomerization process which may be practiced with the process described herein is demonstrated in U.S. Pat. No. 3,283,021. The process of this invention is also adaptable to the production of butadiene from normal butane and for the production of isoprene from isopentane. Another adaptable process is demonstrated in U.S. Pat. No. 2,773,011 wherein the removal of nitrogen compounds for aromatic containing streams is described. Still another process comprises the production of specific xylene isomers by the isomerization of $C_8$ aromatics as described in U.S. Pat. No. 3,078,318. Another petrochemical process to which our invention may be applied is the hydrogenation of aromatic hydrocarbons, such as the production of cyclohexane from benzene. More details on exemplary hydrogenation processes may be obtained from U.S. Pat. Nos. 2,755,317 and 3,700,742. The production of benzene by the hydrodealkylation of alkyl aromatics as described in U.S. Pat. No. 3,204,007 also contains the generic steps of the process of our invention.

The apparatus may be utilized for the production of butadiene from butane by the catalytic oxydehydrogenation of butenes. In one such process, butenes, air and steam are first passed into a reactor containing a mixed oxide catalyst, the reactor effluent is then heat exchanged for the production of high pressure steam and then condensed for the separation of reaction products. Yet another application of our process is the vapor phase production of ethanol by the passage of ethylene, water and recycled ethylene through a bed of suitable catalyst. The reactor effluent is cooled by heat exchange and separated into a liquid stream and a vapor stream, with the liquid being sent to a product recovery zone. Reforming of various hydrocarbons, such as the reforming of relatively light hydrocarbons, or the reforming of naphthas for octane number improvement or for the production of aromatics for use in the petrochemical industries may also be aided by the improved process and apparatus of our invention. This is especially true in the newer low pressure reforming operations, such as those utilizing several moving catalyst beds at pressures of from 50 to 150 psig. Another specific example of a petrochemical process suitable for practice with our invention is the disproportionation of alkyl aromatics, such as, the disproportionation of a single methylbenzene to produce higher and lower methylbenzenes, or the simultaneous production of benzene and mixed xylenes from a toluene feed stock. A combination process to which the invention may be applied is demonstrated in U.S. Pat. No. 3,413,373. Long chain normal paraffins are dehydrogenated and then alkylated with benzene to form a detergent precursor.

The reactor described herein may be applied to the dehydrogenation of normal paraffins having from about 5 to 22 carbon atoms per molecule. The preferred use of the reactor is in the dehydrogenation of straight chain normal paraffin having from 5 to 20 carbon atoms per molecule to the corresponding mono-olefins. The production of the corresponding olefin from these hydrocarbons is important because of their use in the manufacture of various chemical products such as detergents, plastics, synthetic rubbers, pharmeutical products, lubricants, drying oils, ion-exchange resins, plasticizers, solvents and perfumes. As an example, mono-olefins are of substantial importance to the detergent industry for they may be reacted with an alkylatable aromatic such as benzene to produce a product which is transformed into a wide variety of biodegradable detergents. One such detergent is the alkylarylsulfonate type which is widely used today. Another large class of detergents is produced from normal mono-olefins as the condensation products of alkyl phenols and ethylene oxide, prior to which the alkyl phenol base is prepared by the alkylation of phenol with these normal mono-olefins. A second example is the hydration of these mono-olefins to produce alcohol which are useful in the production of plasticizers for synthetic lube oils. The reaction conditions normally employed for the dehydrogenation of normal paraffins include a temperature of from about 800° to about 1,000°F., a pressure of from about 10 to about 200 psig. and a liquid hourly space velocity of about 10 to 40, with a preferred range of liquid hourly space velocities being from about 12 to 34. The liquid hourly space velocity is defined to be the ratio of the liquid phase volume at 60°F. of the quantity of reactants passed through the catalyst bed in one hour to the volume of the catalyst contained within the catalyst bed.

A primary advantage of the present invention is the reduction in the utility costs of operating the process conducted therein. When applied to the illustrated preferred embodiment, the use of a contact condenser located within the reactor results in the reduction of the pressure drop through the entire process of about 4 psig. The placement of the indirect heat exchange means within the reactor also produces a reduction in the pressure drop through the system of about 4 to 5 psig. By the practice of the present invention, it is therefore possible to acquire a horsepower savings of from about 10% to about 16% at the preferred operating conditions. A second advantage of the present invention is the reduction of the capital costs of the equipment necessary for practicing the processes listed above. By referring to the drawing, it is seen that it is no longer required to provide a vessel to surround the indirect heat exchange means used for exchanging the reactor feed stream with the effluent stream. It is also no longer necessary to provide vessels for the subsequent cooling means and for the separation vessel which normally receive the partially condensed catalyst bed effluent stream. There is also no requirement for piping between these vessels. This lowers both the operating and the capital costs of the chosen process.

In the operation of our invention, it is preferred that the liquid effluent material which is removed from the bottom of the reactor is divided into a first portion which is cooled and passed into the top of the reactor as the cooling liquid used in the contact condensing means and a second portion which is passed to a product recovery zone. The amount of material withdrawn as the cooling, or pump-around, liquid will be determined by optimizing such factors as the utilities cost to pump this material and the utilities cost to cool this material to different temperatures. The product recovery zone may consist of a fractionation zone, a liquid-liquid extraction zone or a solid adsorption zone employing molecular sieves. In the preferred hydrogenation process, the range in the number of carbon atoms per molecule in the feed stream is held to within 4 to 5. This material is passed through the catalyst bed and the other steps of the process in the manner already described and the reactor effluent is then passed into a stripping column wherein light materials formed in the process, such as light paraffins, are removed. The remaining portion of the liquid reactor effluent material is then passed into the product recovery zone. When the dehydrogenation process is integrated with a detergent alkylation process, the stripped reactor effluent is passed directly into the alkylation unit and the olefins are consumed in the alkylation reaction. The alkylate is then recovered by fractionation and the unconverted normal paraffins are recycled to the dehydrogenation unit.

EXAMPLE

To aid in understanding the invention, a detailed description of the operation of a fixed-bed catalytic process for production of normal mono-olefins by the dehydrogenation of the corresponding paraffins will be described. The hydrocarbon feed stream is composed of a 10,733 lb./hr. paraffin charge stream and an 81,958 lb./hr. stream of paraffins recycled from a detergent alkylation zone. These materials are combined and pressurized to form a liquid feed stream at 410°F. and 54 psig. A 16,277 lb./hr. recycle gas stream at a temperature of 22°F. and 55 psig. is combined with the liquid feed stream to form a mixed-phase combined feed stream having an average temperature of 303°F.

The combined feed stream is fed into a feed-effluent heat exchange means located within the reactor. This heat exchange means consists of a large number of U-tubes in a circular array around the inside of the innermost catalyst retaining screen. The radial flow reactor is about 7 feet in diameter inside and the catalyst bed contained therein is 9 inches thick. The combined feed stream is completely vaporized within the heat exchange means due to its increase in temperature to 751°F., and its pressure is reduced to 39 psig. Three pounds per hour of water are injected at this point, and the combined feed stream is then passed through a direct fired heating means which further heats the material to 930°F. before it is charged to the reactor at 35 psig. Passage of the heated combined feed stream through the catalyst bed under these conditions, including a combined feed liquid hourly space velocity of 28, causes the dehydrogenation of approximately 8–13 percent of the various paraffins into mono-olefins and results in the production of a corresponding amount of hydrogen. Some isoolefins and diolefins are also produced.

The effluent stream of the catalyst bed enters the centerpipe volume of the reactor at a temperature of about 898°F. and a pressure of about 30 psig. It very quickly impinges upon the adjacent U-tubes of the effluent-feed heat exchange means and is reduced in temperature to about 403°F. After contacting the heat exchange means, the catalyst bed effluent is passed into a packed contact condenser wherein it is cooled and partially condensed. This cooling and condensation is caused by a 186,617 lb./hr. pump-around stream of reactor effluent liquid which has been withdrawn from the reactor and cooled to 100°F. before it is distributed over the top of the contact condenser. The material condensed to form the reactor effluent liquid is the $C_{11}$ to $C_{14}$ paraffins and olefins in the catalyst bed effluent stream. The uncondensed reactor effluent vapor stream is mainly hydrogen with small amounts of various $C_1$ to $C_5$ hydrocarbons and a slight amount of the heavier $C_6$ to $C_{14}$ materials. The reactor effluent vapor stream is removed from a top portion of the reactor at a point over the contact condenser at a pressure of about 27 psig. and a temperature of about 120°–150°F. A small slip stream of this gas comprising 205 lbs./hr. is diverted to a desulfurization process to utilize the hydrogen formed in the process. The remaining portion of the effluent vapor stream is used as the recycle gas stream previously mentioned. The reactor effluent liquid stream is accumulated in the bottom of the reactor and withdrawn at 334°F. and about 27 psig. The pump-around cooling liquid is withdrawn, and the remaining 92,493 lb./hr. liquid stream is passed into a stripping column, which functions as the product recovery zone and operates with a bottom temperature of 495°F. at 28 psig. This produces a 92,297 lb./hr. bottoms stream which is passed into the detergent alkylation zone.

We claim as our invention:

1. A reactor for the catalytic conversion of hydrocarbons which comprises:
   a. a vertically oriented outer cylindrical vessel;
   b. a first vertically orientated catalyst retaining screen, located within the outer vessel a distance redially inward from the inner surface of the outer vessel and defining an annular reactant distribution volume between the first catalyst retaining screen and the outer vessel;
   c. a second vertically orientated catalyst retaining screen located within the first catalyst retaining screen a distance radially inward from the first catalyst retaining screen and defining an annular catalyst retention volume between the first and the second catalyst retaining screens;
   d. an indirect heat exchange means arranged as a vertically orientated substantially hollow cylinder having a cylindrical central void volume and located adjacent to the second catalyst retaining screen, at a distance radially inward from the second catalyst retaining screen;
   e. a contact condensing means located within the central void volume of the indirect heat exchange means, said condensing means comprising cylindrical packed bed of a vapor-liquid contacting media;
   f. a reactant inlet means communicating with the reactant distribution volume;
   g. a vapor outlet means communicating directly with the central void volume of the heat exchange means at a point located above the contact condensing means; and,
   h. a liquid outlet means communicating with the internal volume of the outer vessel at a point located below the contact condensing means.

2. The apparatus of claim 1 further characterized in that there is provided a cooling liquid distribution means connected to a cooling liquid inlet means and located at a point above the contact condensing means.

3. The apparatus of claim 2 further characterized in that the indirect heat exchange means comprises a plurality of U-tube heat exchangers having the respective inlets and outlets thereof located at the upper ends of said U-tube heat exchangers.

4. The apparatus of claim 2 further characterized in that there is provided a first plurality of catalyst transfer conduits passing through an upper portion of the outer vessel and communicating with an upper portion of the catalyst retention volume and a second plurality of catalyst transfer conduits passing through a lower portion of the outer vessel and communicating with a lower portion of the catalyst retention volume.

* * * * *